United States Patent
Potratz et al.

(10) Patent No.: US 9,548,548 B2
(45) Date of Patent: Jan. 17, 2017

(54) METHODS OF ASSEMBLING A NEUTRAL RAIL TO A PLUG-ON NEUTRAL LOAD CENTER

(71) Applicant: Schneider Electric USA, Inc., Palatine, IL (US)

(72) Inventors: Jason D. Potratz, Raleigh, NC (US); David R. Pearson, Palo, IA (US); Kim D. Wheeler, Murfreesboro, TN (US); William J. Broghammer, Anamosa, IA (US)

(73) Assignee: Schneider Electric USA, Inc., Andover, MA (US)

( * ) Notice: Subject to any disclaimer, the term of this patent is extended or adjusted under 35 U.S.C. 154(b) by 852 days.

(21) Appl. No.: 13/720,116

(22) Filed: Dec. 19, 2012

(65) Prior Publication Data

US 2014/0165390 A1    Jun. 19, 2014

(51) Int. Cl.
| | | |
|---|---|---|
| H01H 11/00 | (2006.01) | |
| H01R 9/24 | (2006.01) | |
| H01H 71/08 | (2006.01) | |
| H01R 25/16 | (2006.01) | |

(52) U.S. Cl.
CPC .......... *H01R 9/2458* (2013.01); *H01H 71/082* (2013.01); *H01R 25/16* (2013.01); *Y10T 29/49105* (2015.01); *Y10T 29/49117* (2015.01)

(58) Field of Classification Search
CPC ................... Y10T 29/49117; Y10T 27/49002; Y10T 29/49; Y10T 29/49204; Y10T 29/49208; H01R 9/2458; H01R 9/2483; H01R 9/2608; H01R 11/24; H01R 4/64; H01R 25/16; H01H 83/00

USPC ....... 29/825, 592.1, 874, 876, 622; 361/673, 361/627, 634, 637, 648, 652, 641, 640; 200/1 R, 200/307, 330; 174/67, 72 B
See application file for complete search history.

(56) References Cited

U.S. PATENT DOCUMENTS

| | | | |
|---|---|---|---|
| 2,914,708 | A | 11/1959 | Harold |
| 3,218,519 | A | 11/1965 | Casey |
| 3,339,119 | A | 8/1967 | Stanback et al. |
| 3,349,292 | A | 10/1967 | Meacham |
| 4,079,439 | A | 3/1978 | Coles et al. |
| 4,142,225 | A | 2/1979 | Diersing et al. |
| 4,167,769 | A | 9/1979 | Luke et al. |
| 4,251,851 | A | 2/1981 | Diersing et al. |

(Continued)

OTHER PUBLICATIONS

Eaton Product Brochure, Plug into Savings with the CH Plug-on Neutral Loadcenter and AFCI and GFCI Breakers (2006); 4 pages.

*Primary Examiner* — Peter DungBa Vo
*Assistant Examiner* — Azm Parvez
(74) *Attorney, Agent, or Firm* — Locke Lord LLP

(57) ABSTRACT

A method of assembling a load center featuring a dielectric barrier that securely retains a plug-on neutral rail without requiring any fasteners. The dielectric barrier and the rail are installed in the same Z-axis direction, which is orthogonal to a rear wall of an enclosure into which the load center is installed. Retention features in the dielectric barrier can create a snap-fit connection between the rail and the barrier, or the barrier can feature a support feature onto which the rail snaps as the rail is installed relative to the dielectric barrier in the Z-axis direction. The snap fit connections eliminate the need for any fasteners, and together with the Z-axis assembly, the assembly process is simplified and accelerated and the possibility of assembly error is reduced or eliminated.

16 Claims, 14 Drawing Sheets

(56) References Cited

U.S. PATENT DOCUMENTS

| | | | | |
|---|---|---|---|---|
| 4,449,296 | A | * | 5/1984 | Luke ................. H02B 1/056 |
| | | | | 29/883 |
| 4,667,269 | A | | 5/1987 | Morby et al. |
| 5,134,543 | A | | 7/1992 | Sharp et al. |
| 5,179,491 | A | | 1/1993 | Runyan |
| 5,245,302 | A | | 9/1993 | Brune et al. |
| 5,250,918 | A | | 10/1993 | Edds et al. |
| 5,302,787 | A | | 4/1994 | Edds et al. |
| 5,450,282 | A | | 9/1995 | Webber et al. |
| 6,266,232 | B1 | | 7/2001 | Rose et al. |
| 6,459,570 | B1 | | 10/2002 | Buchanan |
| 7,083,437 | B2 | * | 8/2006 | Mackness ............. B64C 1/20 |
| | | | | 439/110 |
| 7,245,480 | B2 | * | 7/2007 | Dixon ................. H02B 1/056 |
| | | | | 200/293 |
| 7,417,849 | B2 | | 8/2008 | Dixon et al. |
| 7,449,645 | B1 | | 11/2008 | Flegel |
| 7,508,653 | B2 | | 3/2009 | Parlee |
| 7,655,865 | B2 | * | 2/2010 | Wagener ............. H02G 5/025 |
| | | | | 174/99 B |
| 7,772,723 | B1 | | 8/2010 | Flegel |
| 7,957,122 | B2 | | 6/2011 | Sharp |
| 2008/0003850 | A1 | | 1/2008 | Seff et al. |
| 2008/0158787 | A1 | | 7/2008 | Parlee |

* cited by examiner

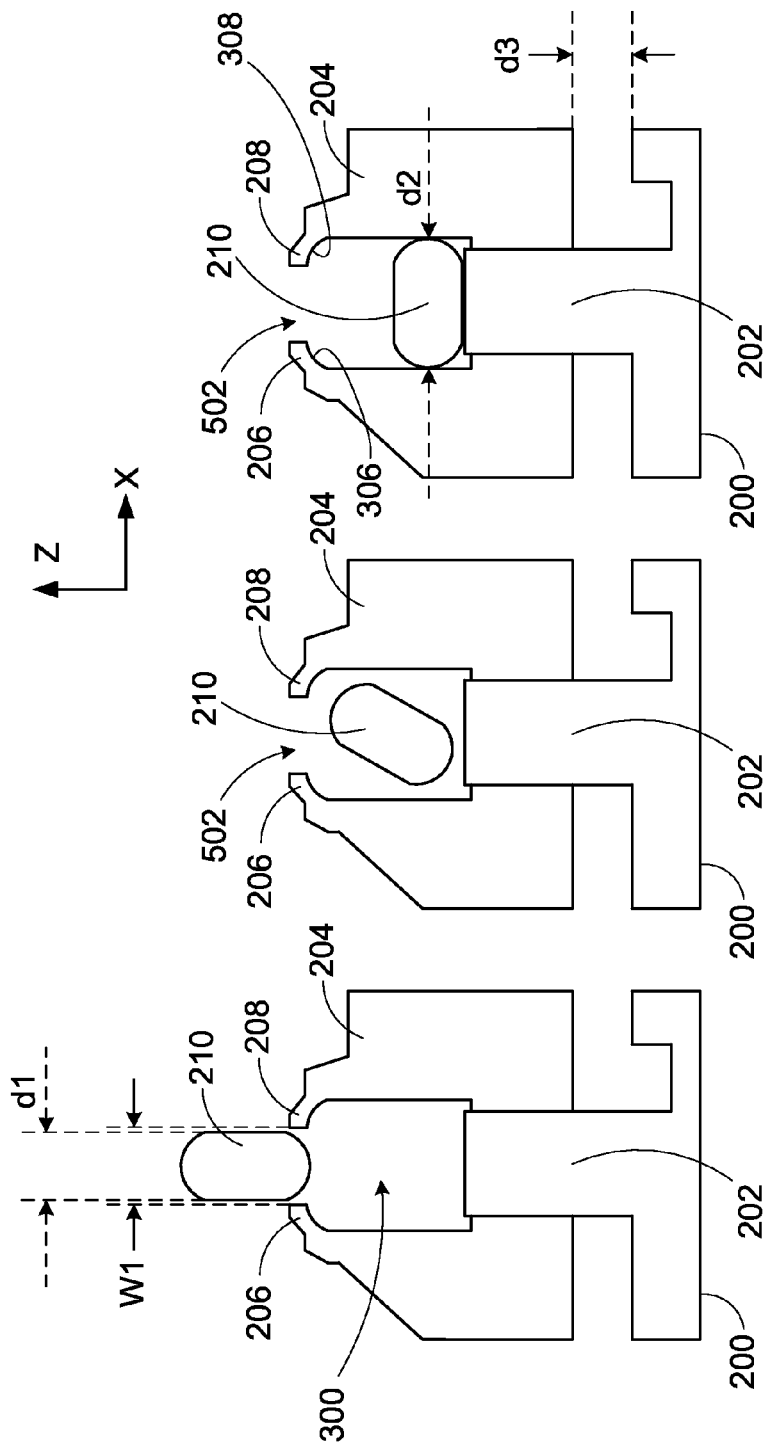

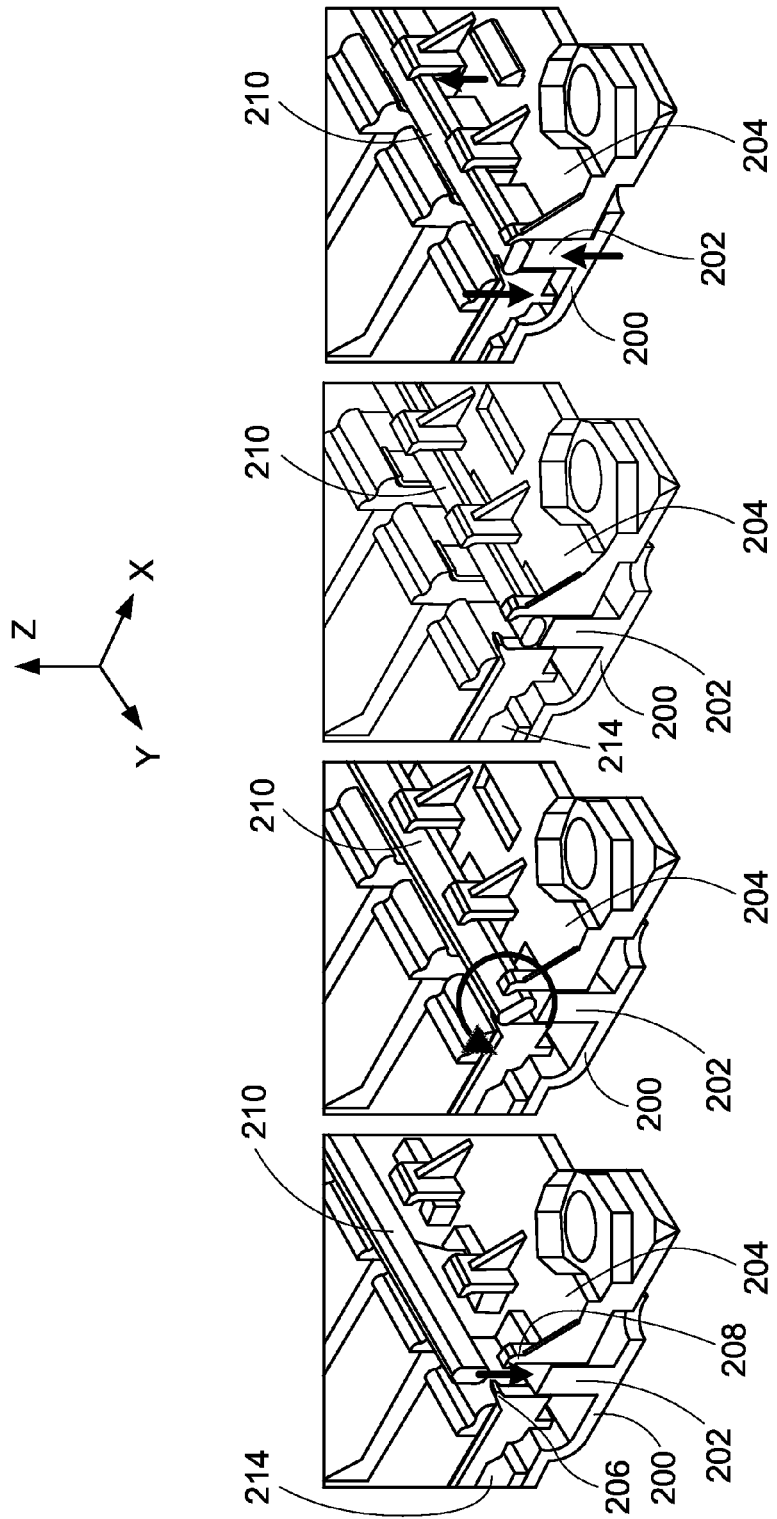

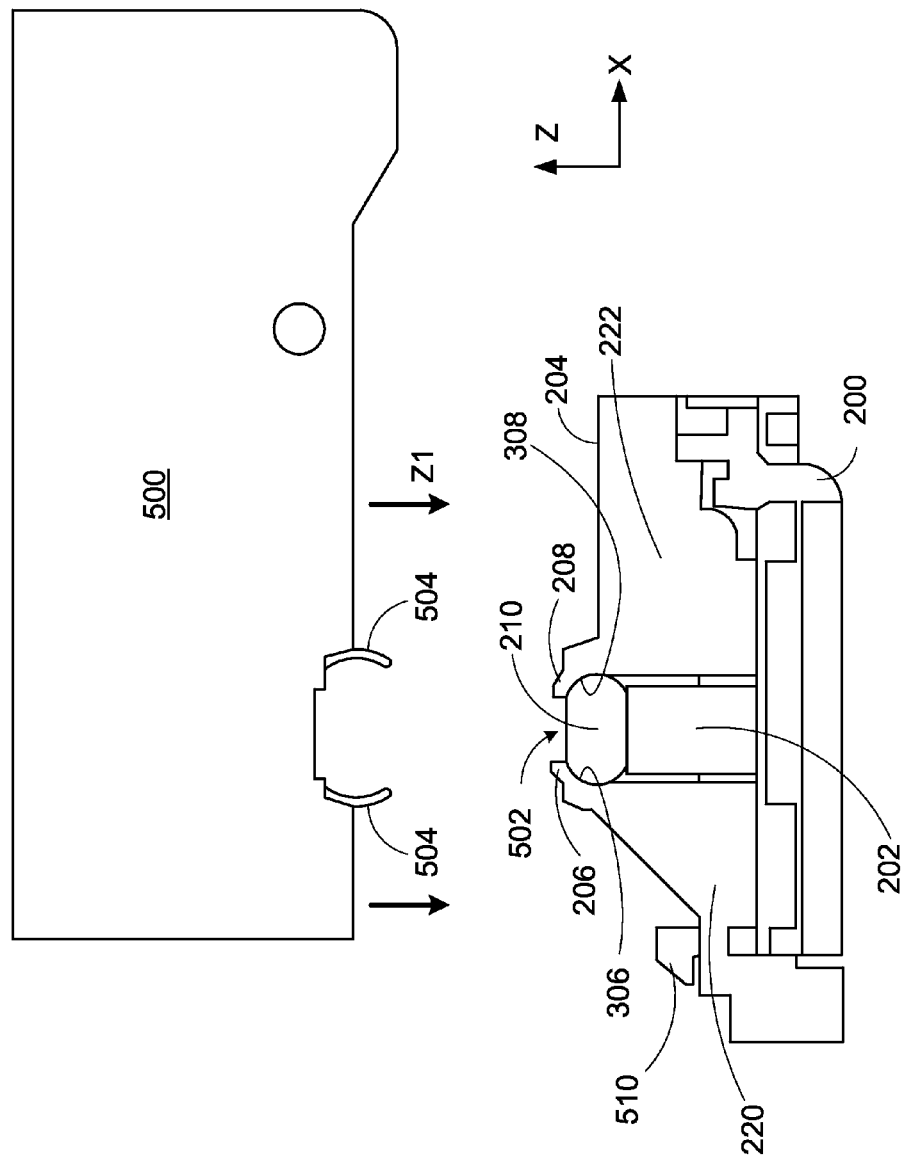

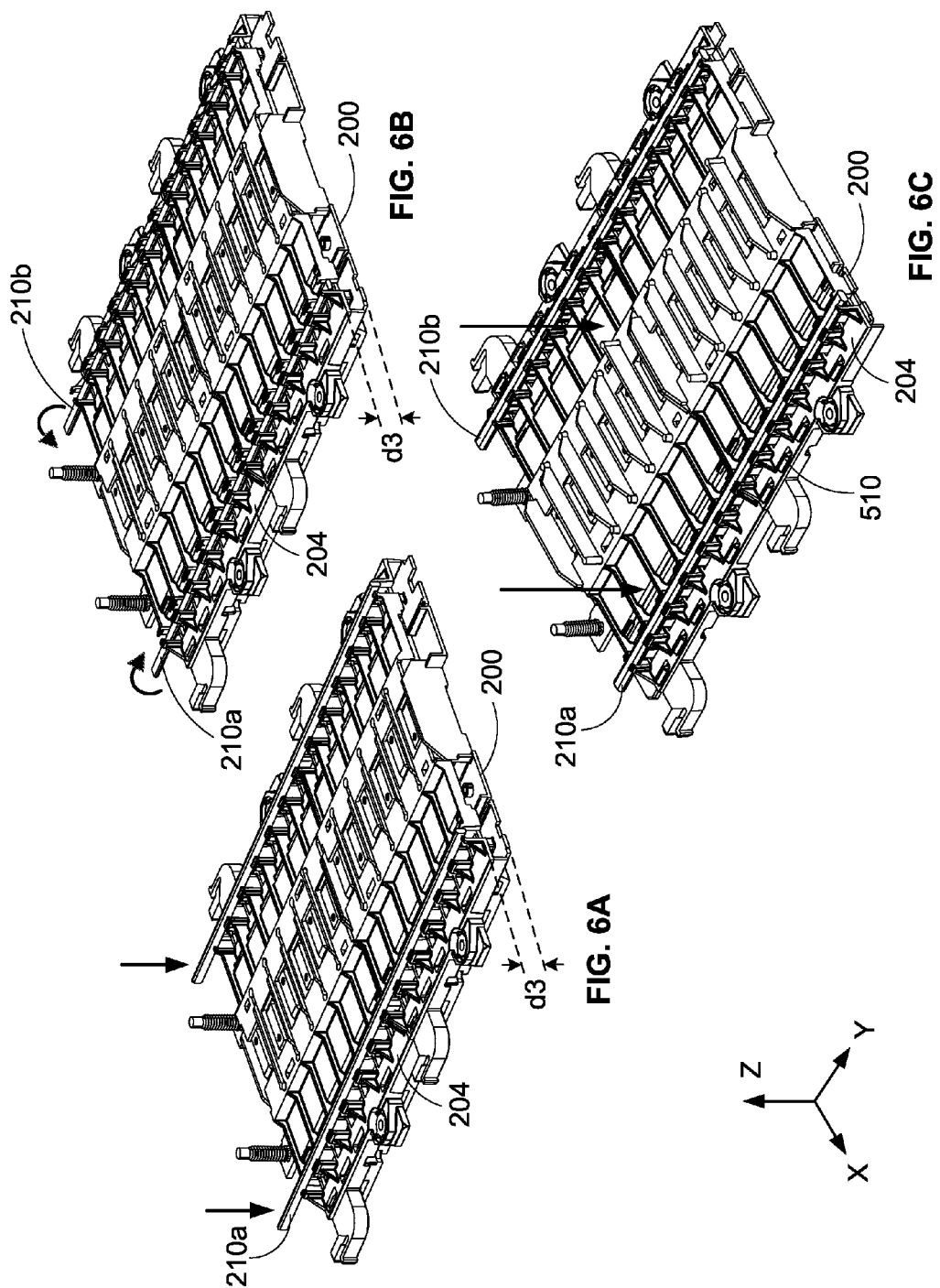

METHODS OF ASSEMBLING A NEUTRAL RAIL TO A PLUG-ON NEUTRAL LOAD CENTER

FIELD OF THE INVENTION

The present disclosure relates to electrical distribution equipment and methods of assembling the same, and in particular, to a method of assembling components of a plug-on neutral load center in a Z-axis direction.

BACKGROUND

A load center is housed within a metal enclosure or panel and holds multiple circuit breakers that are connected to various branch circuits in an electrical distribution system. Some load centers feature a plug-on neutral rail or conductor to which neutral connectors or jaws of the circuit breakers plug onto. These plug-on type circuit breakers have the convenience of being able to plug directly onto the neutral rail without using any fasteners or wiring to connect the circuit breaker to the neutral busbar in the load center. Assembling the dielectric and conductive pieces of the load center before installing it into the enclosure is a time-consuming, labor-intensive process. A need exists for reducing and simplifying the assembly of the load center using fewer components and fewer steps.

BRIEF SUMMARY

There are two principal categories of plug-on neutral rail assemblies discussed herein, along with a few additional configurations. One set of assemblies can be referred to as featuring "snap-in" plug-on neutral rails in which the neutral rail snaps (e.g., by a snap fit connection) into retention features formed in the dielectric barrier that separates the energized phase conductors from the grounded metal enclosure into which the plug-on load center is installed, without any fasteners attaching the neutral rail to the dielectric barrier. "Plug-on" in this context refers to the type of neutral jaw or connector in the circuit breakers that are attached to the neutral rail. These neutral jaws simply plug onto the neutral rail without any fasteners, and the circuit breaker is simply rotated onto the neutral rail until the neutral jaws grab and engage the neutral rail to make the mechanical and electrical connection between the neutral busbar of the load center and the neutral side of the circuit breaker. The assemblies described herein can be referred to as featuring "snap-on" neutral rails in which the neutral rail snaps onto a support member on the dielectric barrier without any fasteners. The dielectric barrier can include two pieces—a dielectric base that maintains an airgap separation between the downwardly extending neutral conductors and the grounded metal wall of the enclosure, and a shield member that creates a dielectric insulation between the energized phase conductors carrying line or phase current to electrical stabs in the load center and the neutral rail and grounded metal enclosure. The support and retention features in the snap-in and snap-on embodiments can be formed in the base or the shield member or a combination of both.

A load-center has a two-piece, dielectric, insulating and retaining barrier between a plug-on neutral rail and line or phase conductors for connecting electronic circuit breakers with plug-on neutral connectors to the load center. The barrier has a base and a shield member, which have corresponding features that mutually cooperate to securely retain the neutral rail within the load center. The neutral rail has a "rolling pill-shaped" rounded rectangular cross section with a skinny (narrow) and fatter (wide) dimension. The shield member has retention features that resemble fingers arched toward one another to form an air gap between which the neutral rail is inserted lengthwise along its skinny dimension. For its part, the base contributes a protrusion feature that protrudes away from the base, and when the neutral rail is dropped between the gap, it automatically rotates, thanks to its rounded "rolling pill" edges, by 90 degrees until it rests on the protrusion of the base along its fatter dimension and against inner surfaces of the finger-like retaining features.

The shield member and the base are snapped or otherwise secured together, causing the protrusion of the base to push the neutral rail into secure engagement against inner or lower surfaces of the retention features of the shield member. This engagement is strong enough to keep the neutral rail from separating from the shield member as plug-on neutral connectors of circuit breakers are installed onto and removed from the neutral rail.

A method of assembling a load center, such as the one just described, is also disclosed. The assembly involves a top-down assembly, in which components of the load center are assembled in a single direction without requiring any repositioning or reorientation of the load center as the above-described components are installed. First, the base is laid down and the shield member is installed over the top of the base. The base can optionally include shield retaining features, for example, in the form of hooks, that eventually hook into corresponding grooves or apertures in the shield member. The bottom of the shield member can rest on top of these hooks, creating enough distance between the protrusion(s) of the base and the retaining fingers of the shield to allow space for the neutral rail to clear the retention features when inserted lengthwise through the gap along its skinny dimension. It should be emphasized that the protrusion can be part of the shield instead of the base.

Once the neutral rail rotates by 90 degrees so that it rests on the protrusion of the base along a surface defining the fatter dimension, the shield member is pressed down against the base, causing the snap fit clips 510 of the base to engage the grooves or apertures in the shield member 204. At the same time, the space between the protrusion 202 of the base and the retention features (fingers) of the shield member closes in until the top of the neutral rail abuts against the retention features of the shield member and the bottom of the neutral rail rests on the protrusion of the base. No fasteners of any kind are required to assemble the base, shield member, and neutral rail together, though use of fasteners is not precluded either. Moreover, these components of the load center are installed along the same axis (e.g., from the top of the load center toward the rear wall of the metal enclosure into which the load center is eventually installed) without requiring any fasteners or repositioning of the load-center components as they are installed. The assembled load center can then be installed onto a rear wall of an enclosure and is accessible from a conventional door or access panel of the enclosure. A neutral connector is used to connect the neutral rail to the neutral busbar of the load center, which is eventually connected by wires to neutral wiring outside the enclosure.

A further aspect includes a shield member having a pair of fingers that are arched toward one another to create an air gap that is smaller than a width of the neutral rail. The neutral rail is pushed downward through the gap to cause the fingers to separate slightly until the neutral rail snaps into place beneath the fingers, whereupon they snap back to their unstressed position, thereby creating a snap fit connection between the shield member and the neutral rail without the need for any fasteners.

In another aspect, the neutral rail has a cross section in which flat notches are formed on either side of the neutral rail. The shield member has two arched fingers with hook ends that grab onto the flat notches when the neutral rail is inserted between a gap spanning across the arched fingers. The hook ends hold the flat notches of the neutral rail in a snap fit engagement without the need for any fasteners. The fingers are spread apart slightly as the neutral rail is inserted along a Z-axis (orthogonal to the rear wall of the enclosure) through the gap before returning to an unstressed position.

In yet another aspect, the base and the shield member cooperate to secure the neutral rail in position in the load center. The base includes a retention member and the shield member includes a corresponding retention member. The base is laid down first along the Z-axis, then the neutral rail is installed into the retention member of the base also along the Z-axis, and finally the shield member is installed along the Z-axis over the base to securely engage the neutral rail between the retention members of the base and the shield member. Again, no fasteners are necessary.

Not every aspect of the inventive concepts disclosed herein has been included in this summary. This summary represents one of many ways of implementing an exemplary aspect of the present disclosure. This and other implementations are described in more detail in the description that follows.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

FIG. 3A is a cross-sectional view of part of the shield member and the base with the neutral rail being dropped along a z-axis direction between a gap formed by retention features of the shield member;

FIG. 3B illustrates the neutral rail shown in FIG. 3A being rotated by 90 degrees to a resting position shown in FIG. 3C;

FIG. 3C illustrates the neutral rail shown in FIG. 3B fully rotated by 90 degrees to a resting position on top of a protrusion of the base before snapping the base and the shield member together along the z-axis direction;

FIG. 4A is a perspective view of the neutral rail being dropped into gaps between retention features of the shield member along a z-axis direction;

FIG. 4B illustrates the neutral rail of FIG. 4A being rotated into a resting position on top of a protrusion of the base;

FIG. 4C illustrates the neutral rail of FIG. 4B in a resting position and rotated by 90 degrees relative to its position when it was dropped in between the gaps shown in FIG. 4A;

FIG. 4D illustrates the neutral rail of FIG. 4C secured between the shield member and the base by forcing the two together along the z-axis direction to cause the protrusion to close the gap between the neutral rail and the retention features of the shield member;

FIG. 5 is a cross-sectional view of the neutral rail in an installed position relative to the shield member and the base with a circuit breaker and a neutral connector or jaw positioned to be plugged onto the neutral rail along a z-axis direction;

FIG. 6A is a perspective view of a plug-on section of the load center featuring two neutral rails being dropped along a z-axis direction between corresponding gaps between retention features of shield members on left and right sides of the load center;

FIG. 6B illustrates the neutral rails shown in FIG. 6A being rotated 90 degrees to rest on their wide dimensions on respective protrusions in the base on either side of the load center;

FIG. 6C illustrates the neutral rails shown in FIG. 6B in their installed, retained position relative to the shield member and the base after the shield member and the base have been snap-fit together in a direction along the z-axis;

Figure 1:
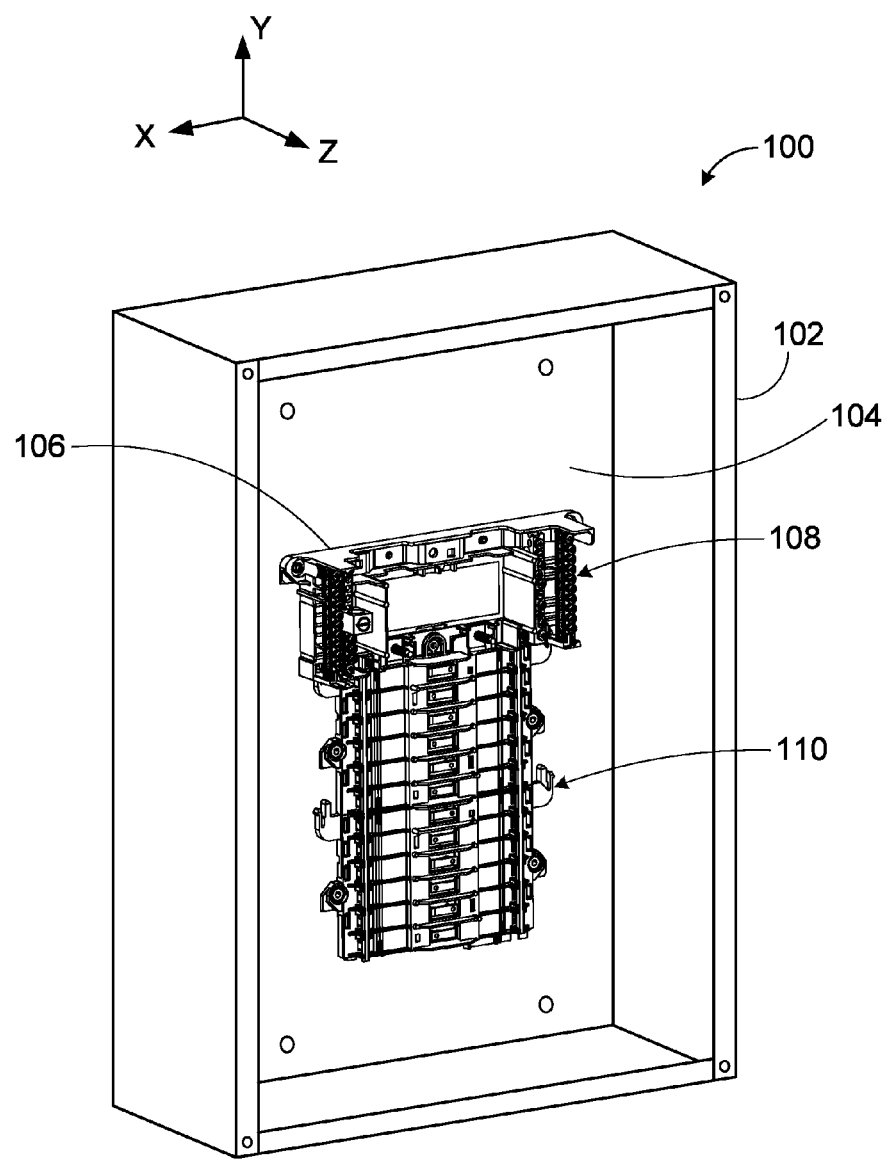
FIG. 1 is a perspective view of an enclosure housing a load center with the door or access panel removed.

While aspects of the present disclosure are susceptible to various modifications and alternative forms, specific embodiments or implementations have been shown by way of example in the drawings and will be described in detail herein. It should be understood, however, that this disclosure is not intended to be limited to the particular forms disclosed. Rather, this disclosure is to cover all modifications, equivalents, and alternatives falling within the spirit and scope of the invention as defined by the appended claims.

DETAILED DESCRIPTION

Referring to FIG. 1, a perspective view of an enclosure 102 of an electrical distribution apparatus 100, such as a panelboard or load center 106, is shown with the door or cover removed so that the lug and mounting connections of the load center 106 to plug-on neutral type circuit breakers can be seen. The load center 106 includes a main section 108 and a plug-on section 110. In general, like reference numbers refer to like structures throughout the figures and various embodiments, and a reference number starts with the number of the figure where the reference number is first introduced. The enclosure 102 is metal and has a rear wall 104 opposite the panel or door (not shown) to which the main section 108 and the plug-on section 110 is mounted.

Figure 2A:
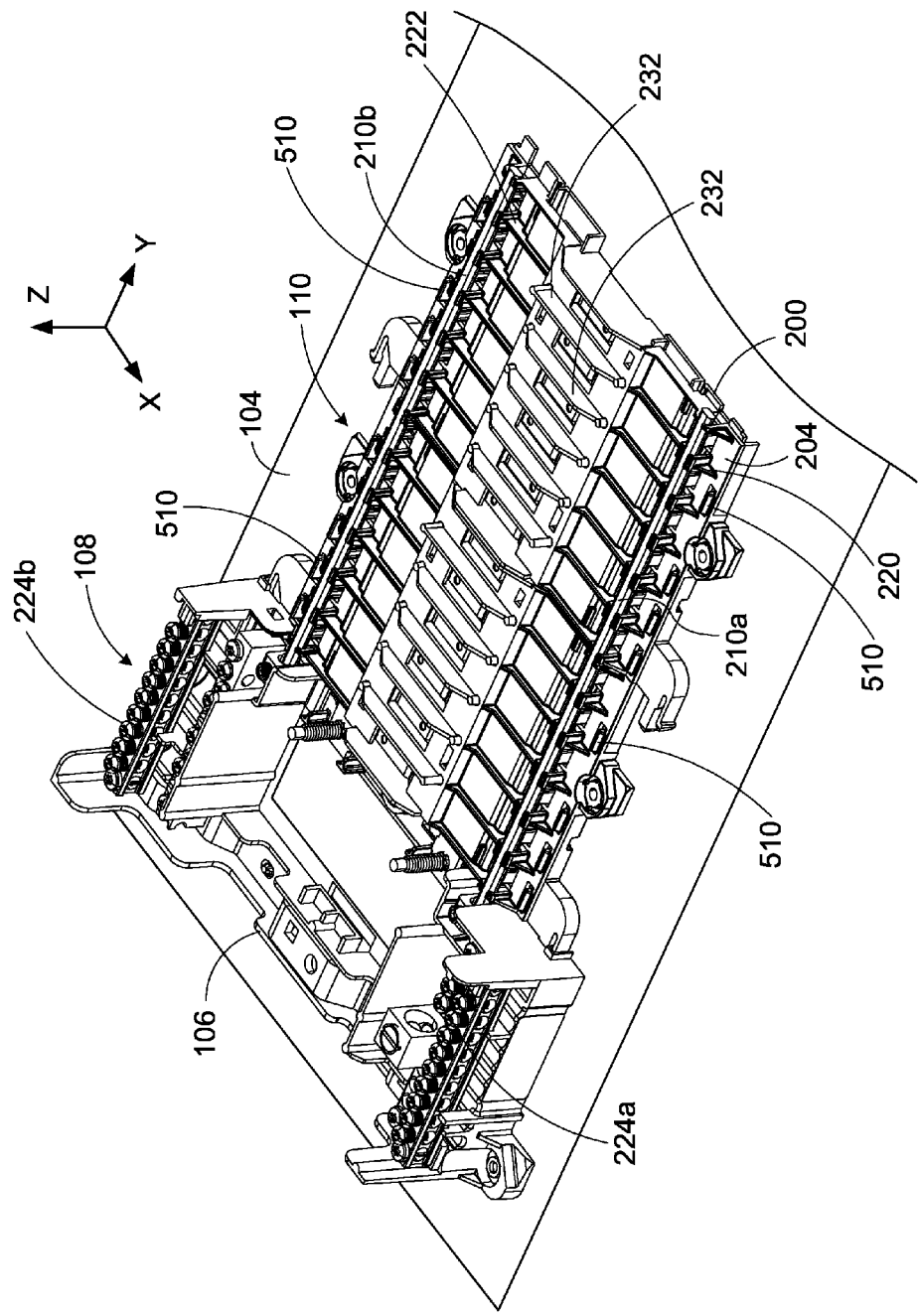
FIG. 2A is a top perspective view of the load center showing two neutral rails installed and securely retained between a dielectric shield member and a dielectric base according to an aspect of the present disclosure.
Figure 2B:
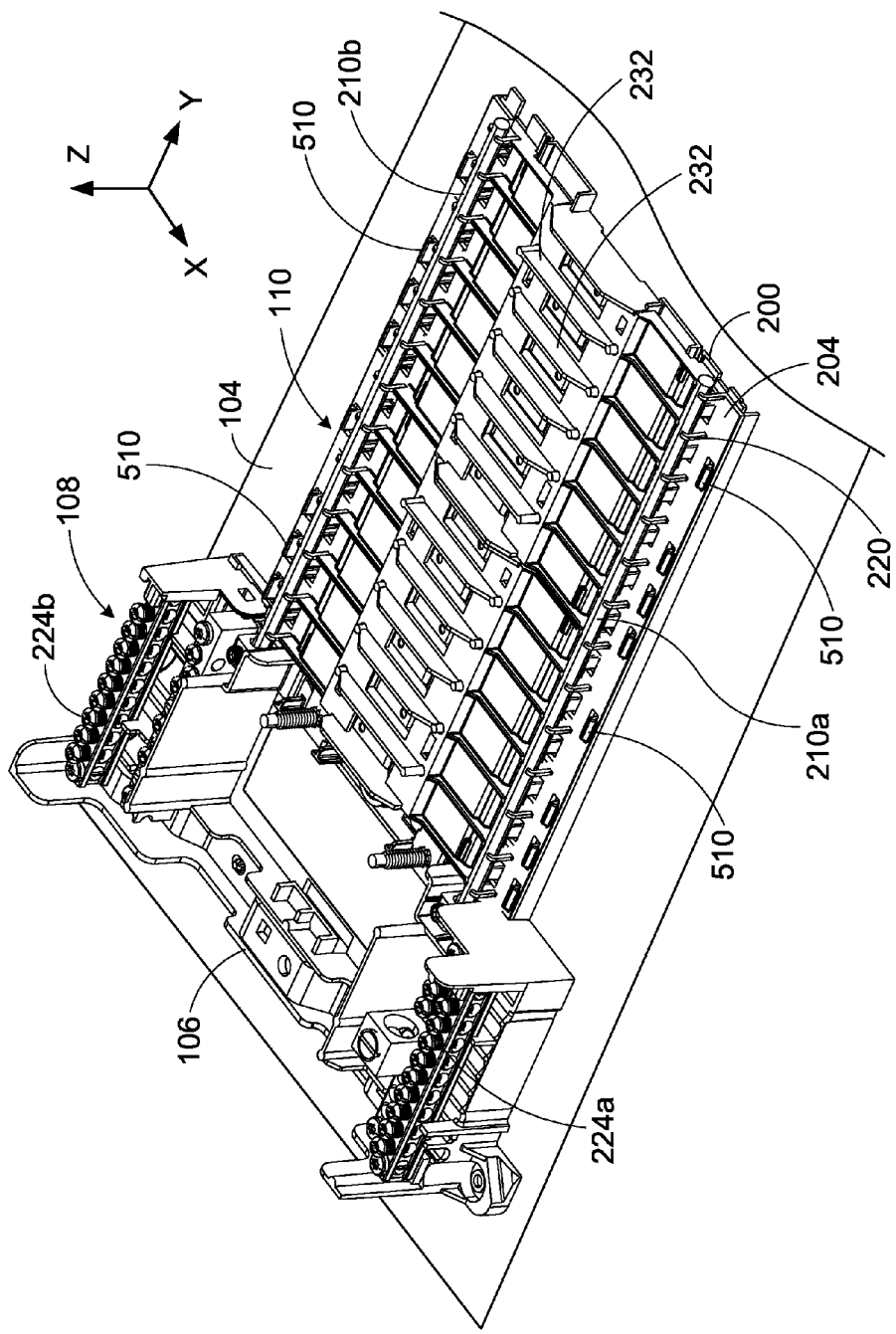
FIG. 2B is a top perspective view of the load center showing two neutral rails installed and securely retained between a dielectric shield member and a dielectric base in snap-in or snap-on configurations according to various aspects of the present disclosure.

The focus of this disclosure is on the plug-on section 110, which features a neutral rail 210 (shown in FIGS. 2A and 2B) as described in more detail below. Both FIGS. 2A and 2B illustrate a perspective view of a plug-on section, but have different ways of securing the neutral rail 210 into the load center 106. FIG. 2A has a "drop in and rotate" neutral rail 210 configuration, whereas FIG. 2B has a "snap-in" neutral rail configuration. Still other implementations described herein feature a "snap-on" neutral rail configuration. All of the configurations herein feature a Z-axis assembly, in which components of the plug-on section 110 are installed along the same Z-axis direction (Z-axis is defined below as being orthogonal to the rear wall 104 of the enclosure 102). Like reference numbers refer to like elements in the figures, even though they may appear in different configurations or embodiments.

The neutral rail 210 is made of an electrically conducting material such as aluminum or copper. Circuit breakers, of which there can be, for example, 24 or 30 or 60 per enclosure 102, such as a circuit breaker 500 (FIG. 5), featuring a plug-on neutral connector 504 (FIG. 5) can be mounted to the neutral rail 210 in the plug-on section 110 by plugging the connector 504 onto the neutral rail 210 without requiring any other fasteners to secure the neutral connection of the circuit breaker 500 to the load center 106. The neutral connector 504 of the circuit breaker 500 connects the circuit breaker 500 to neutral current distributed by the electrical distribution apparatus 100. The circuit breaker 500 also has a conventional line or phase connector or jaw (not shown), which connects to a line or phase current also distributed by the electrical distribution apparatus 100, which is connected between a source (e.g., one or more phases) of electrical current and one or more loads in one or more electrical circuits protected by the circuit breakers 500 installed in the electrical distribution apparatus 100. An example of a suitable circuit breaker 500 is any electronic neutral plug-on type circuit breaker from the SQUARE D® brand QO® or HOM® line of circuit breakers available from Schneider Electric. Of course, any other circuit breaker having a plug-on neutral connector can be used as the circuit breaker 500, and can be from the same or different manufacturers as other circuit breakers installed on the load center 106.

The plug-on section 110 of the load center 106 includes a fixed dielectric base 200 having a major surface that defines an X-Y (Cartesian coordinates) plane as shown in FIG. 2A. The Z-axis is orthogonal to the X-Y plane. The base 200 (FIG. 5) is fixed relative to the rear wall 104 of the enclosure 102, and includes a protrusion 202 that extends away from the X-Y plane along the Z-axis, as can be seen in FIG. 5. The plug-on section 110 also includes a dielectric shield member 204 (FIG. 5) that is separate from the fixed dielectric base 200. The dielectric shield member 204 and the base 200 together form a two-piece dielectric (insulating) barrier between the neutral rail 210 and phase conductors 214 (shown in FIG. 4A) carrying line or phase current to the load center 106. The phase conductors 214 are connected to stabs 232, shown in FIGS. 2A and 2B, to which a corresponding line jaw (not shown) of the circuit breaker 500 are connected.

The dielectric shield member 204 has opposing retention features 206, 208 (best seen in FIG. 5) positioned when installed against the base 200 a distance from the X-Y plane along the Z-axis and from the protrusion 202. Other retention features are shown in other figures, such as the retention features 910, 920 in FIG. 7 and the retention features 1102, 1104 in FIG. 8. A retention "feature" is a structural feature that retains another structure in a fixed position or in a secure engagement relative to one another. The opposing retention features 206, 208 resemble finger members that form an air gap 502 (FIG. 5) therebetween. This gap 502 has a width W1 (FIG. 3A).

The plug-on neutral rail 210 has an elongate (lengthwise) shape, such as a rail, having a cross section whose first dimension d1 (FIG. 3A), such as a height, is smaller than a second dimension d2, such as a width, (FIG. 3C) which is orthogonal to the first dimension d1. The width W1 of the gap 502 between the retention features 206, 208 is larger than the first dimension d1 but smaller than the second dimension d2, such that d1<W1<d2. As a result, as explained below, the rail 210 shown in FIG. 2A must be inserted along the Z-axis lengthwise (e.g., the longest dimension of the rail 210 lying along the Y-axis) through the gap 502 along the "skinny" or narrow dimension of the rail 210 defined by the distance d1. The gap 502 is dimensioned such that the rail 210 cannot be inserted along the Z-axis through the gap 502 along the "fatter" dimension of the rail 210 defined by the distance d2. For example, the distance d2 can be 0.25 inches so that the rail 210 is compatible with existing plug-on neutral connectors or breaker mounting clips that mechanically attach to the rail 210, such as the connectors 504. For example, the rail 210 can have a length of 9.5 inches to accommodate up to 12 neutral plug-on type circuit breakers or 23 inches to accommodate up to 30 neutral plug-on type circuit breakers. As described below, the neutral rail 210 shown in FIG. 2B can be snap-fitted between the retention features, such as the retention features 910, 912 shown in FIG. 7, without requiring any rotation of the neutral rail 210 to secure it into the plug-on section 110.

The base 200 in FIGS. 2A and 2B also operates to maintain a through-air gap spacing, such as 0.5 inches, between the neutral rail 210 and the grounded rear wall 104 of the enclosure 102. This ensures that the neutral connectors 504 of the circuit breakers 500 installed on the neutral rail 210 when energized do not produce an arc or ground fault relative to the grounded rear wall 104. The shield member 204 operates to maintain a dielectric separation between the phase conductors 214 (FIG. 4A) and the neutral rail 210. The phase conductors 214 are sandwiched between the base 200 and the shield member 204, creating a dielectric separation relative to both the grounded enclosure 100 and the energized phase conductors 214 and neutral rails 210a,b.

The main section 108 includes neutral busbars 224a, 224b, which are physically and electrically connected to the neutral rails 210. The neutral busbars 224a, 224b conventionally connect the load center 106 to a neutral electrical current returned to a power source external to the enclosure 102.

As explained in more detail below, in short, the neutral rail 210 shown in FIG. 2A is inserted lengthwise along its skinny or narrow dimension (d1) through the gap 502. The cross section of the neutral rail 210 can be generally oblong or oval or rounded rectangular, i.e., rectangular with rounded corners, and can be generally or substantially constant (unvarying) across the entire length of the neutral rail 210, rendering it simple to extrude during fabrication of the rail 210. By "generally" or "substantially" constant or unvarying, it is contemplated that notches or apertures or small protrusions can be present along the length of the neutral rail 210 or that the rail 210 can be tapered to a smaller cross section at both ends, but its cross section remains the same along a substantial majority of the length of the rail 210. The neutral rail 210 can have small notches, apertures, or protrusions along the length of the rail 210 without departing from the scope of the present disclosure.

If the neutral rail 210 features tapered or non-square corners or edges extending along the conductor's length (Y-axis), such rounded corners or edges allow the rail 210 to automatically rotate by 90 degrees, as shown in FIG. 3B, once the rail 210 is inserted in lengthwise fashion through the gap 502 along the Z-axis and enters a retaining area 300 (FIG. 3A) between the protrusion 202 and the retention features 206, 208 and then falls by gravity onto the protrusion 202 where it rests along the length of its fatter dimension (d2). In a load center 106 that accepts many circuit breakers, such as 24 or 30 or 60 (either 12 or 15 or 30 per side) circuit breakers, there will be a corresponding number of protrusions 202 and retention features 206, 208 disposed along the length (Y-dimension) of the plug-on section 110 of the load center 106 as shown in FIGS. 2A-2B. Only one set of retention features 206, 208 and protrusions 202 is described, as the other retention features and protrusions are identical. In this pre-installed position, the height of the retaining area 300 (FIG. 3A) is dimensioned to be slightly greater than the width d2 of the rail 210. The shield member 204 is raised (along the Z-axis) relative to the base 200 to create the retaining area 300. Once the neutral rail 210 rotates by 90 degrees, as shown in FIG. 3C, the shield member 204 is forced (along the Z-axis) toward the base 200, which causes the protrusion 202 to enter the retaining area 300, forcing the rail 210 up against the retention features 206, 208 until the distance between the protrusion 202 and the ends of retention features 206, 208 forming the gap 502 becomes smaller than the distance d2. This distance approximately corresponds to the distance d1, snugly nestling the rail 210 against the retention features 206, 208 and securing it to the shield member 204 on the base 200 (see FIG. 5) within the retaining area 300. The retention features 206, 208 hold the rail 210 in place while the neutral plug-on connectors 502 of one or more circuit breakers, such as the circuit breaker 500, are connected to and disconnected from the rail 210. No fasteners are required for this assembly, though they are not precluded either.

The "rolling pill" shape of the neutral rail 210 shown in FIG. 2A in the examples shown has several advantages. It uses less metal (e.g., aluminum or copper) versus a rod-shaped conductor having the same diameter as the distance d2 of the rail 210. As mentioned above, its tapered edges allow the rail 210 to automatically rotate by 90 degrees when dropped through the gap 502. It is also relatively easy to extrude during manufacturing.

As mentioned above, each of the retention features 206, 208 can resemble a finger member. Referring to FIG. 3C, each of the finger members 206, 208 has a corresponding inner surface 306, 308. The shape of the inner surfaces 306, 308 conforms to an edge portion (running lengthwise along the Y-axis) of the neutral rail 210 so that when the neutral rail 210 is urged by the protrusion 202 against the inner surfaces 306, 308, they are securely retained in space between the protrusion 202 and the inner surfaces 306, 308 of the finger members 206, 208, as can be seen in FIG. 5. In the installed position shown in FIG. 5, the neutral rail 210 is secured between the shield member 204 and the base 200. The protrusion 202 can extend along substantially the entirety of the length (along the Y-axis) of the shield member 204, or individual protrusions 202 can be spaced to correspond to each set of retention features 206, 208.

The neutral connector 504 of the circuit breaker 500 can be plugged onto the neutral rail 210, which is itself retained by the retention features 206, 208 between the shield member 204 and the base 200 by the protrusion 202, along the Z-axis direction as indicated by the arrow Z1 shown in FIG. 5. The protrusion 202 is configured and is operable to create the retaining area 300 as the neutral rail 210 is installed in a Z-axis direction through the gap 502 between the retention features 206, 208, and then to force the rail 210 after it is rotated 90 degrees into secure engagement against the retention features 206, 208.

Each of the retention features 206, 208 can be supported on the shield member 204 by a pair of supports 220, 222, such as shown in FIGS. 2A and 5. The support 220 can resemble a flying buttress, and the supports 220, 222 provide Z-axis rigidity to the retaining features 206, 208 to prevent them from flexing apart, thereby undesirably widening the gap 502, over time or during continuous mounting and dismounting of plug-on circuit breakers 500 relative to the neutral rail 210.

To retain the shield member 204 relative to the base 200 in a fixed arrangement, one or more snap fit clips 510 (shown in FIG. 5), which can resemble hooks, protrude along the Z-axis from the base 200 and snap fit in place when the shield member 204 is installed along the Z-axis onto the base 200. As can be seen in FIGS. 2A and 2B, numerous such snap fit clips 510 can be disposed along the base 200 to securely retain the shield member 204 relative to the base 200 when fully installed. As noted below, it is advantageous that the entire load center 106 can be assembled along the Z-axis only. For example, in the FIG. 2A example, the assembly can include first providing the base 200, then placing the shield 204 over the base 200, then (in the case of FIG. 2A) dropping in the rail 210 along its skinny (narrow) dimension, causing the rail 210 to rotate 90 degrees along its wide dimension, and then snapping the shield 204 into the base 200 by operation of the snap fit clips 510 of the base 200 engaging the shield 204.

As mentioned above, an advantageous aspect of the present disclosure is how the load center 106 is assembled. Assembling the various components of the load center 106 along one axis only (namely, the Z-axis) results in a faster assembly time, fewer steps, and can be done manually or automatically readily with relatively little sophistication. FIGS. 4A-4D illustrate a sequence of four steps to install the neutral rail 210 shown in FIG. 2A into the load center 106. These are shown in perspective views in FIGS. 6A-6C.

A fixed dielectric base 200 is provided, like the base 200 shown and described above. The base 200 has a major surface lying along the X-Y plane and a protrusion 202 extending away from the X-Y plane along a Z-axis orthogonal to the X-Y plane. In FIGS. 4A and 6A, the base 200 is already provided. The load center 106 can be assembled outside of the enclosure 102, for example. Next, the dielectric shield member 204 is placed over the base along the Z-axis such that a bottom surface of the shield member 204 rests a distance above (see distance d3 in FIG. 3C) a top surface of the base 200. For example, the shield member 204 can temporarily rest on the snap fit clips 510 over the base 200 while the rail 210 is installed.

As shown by the arrows in FIGS. 4A and 6A, the elongate plug-on neutral rail 210 is inserted lengthwise through the gap 502 in a direction along the Z-axis (FIG. 5). As noted above, the oblong cross-section (e.g., rounded rectangular having a narrow dimension and a wide dimension) of the rail 210 causes the rail 210 to rotate automatically by 90 degrees. Alternately, the rail 210 can be manually rotated until it rests on top of the protrusion 202 along its wide edge. These rotations are shown by the arrows in FIGS. 4B and 6B and can also be seen in FIG. 3B. Note that the rotations can occur either clockwise or anti-clockwise, so either rotational direction is contemplated though only an exemplary one is shown. The final resting position of the conductor is shown in FIG. 4C (also FIG. 3C), before the shield member 204 is secured to the base 200. Once the rail 210 is rotated so that its surface corresponding to the wide dimension rests on the protrusion 202 (as shown in FIGS. 3C and 4C), a force along the Z-axis (see the arrows in FIG. 4D) is applied to decrease the distance d3 between the bottom surface of the shield member 204 and the top surface of the base 200 until the surface of rail 210 along its wide dimension rests on the protrusion 202 as shown in FIGS. 4D and 6C. Of course, as shown in FIGS. 6A-6C, when there are two conductors 210a, 210b in the load center 106, the force operates to snap the shield member 204 to the base 200 and securely retain therebetween the two conductors 210a, 210b.

As noted above, the rounded rectangular shape of the neutral rail 210 lends itself to automatically rotating the neutral rail 210 once it is dropped between the gap 502. A ramp feature (not shown) can formed in the shield member 204 at the bottom of the retaining area 300 to begin tipping the neutral rail 210 clockwise or anti-clockwise until the protrusion 202 is fully seated within the retaining area 300 as the shield member 204 and the base 200 are brought together. This ramp feature would accommodate neutral rails of any form factors that are not inclined to automatically rotate. For example, rectangular-shaped neutral rails would not rotate when dropped into the retaining area 300 through the gap 502, but instead would rest on the protrusion 202 along the skinny dimension. To assist in beginning to rotate such a neutral rail, a ramp feature can be formed in the shield member 204 as described to tip the neutral rail off of its skinny dimension until it is fully seated into position by the upward movement of the protrusion 202 into the retaining area 300.

Figure 7:
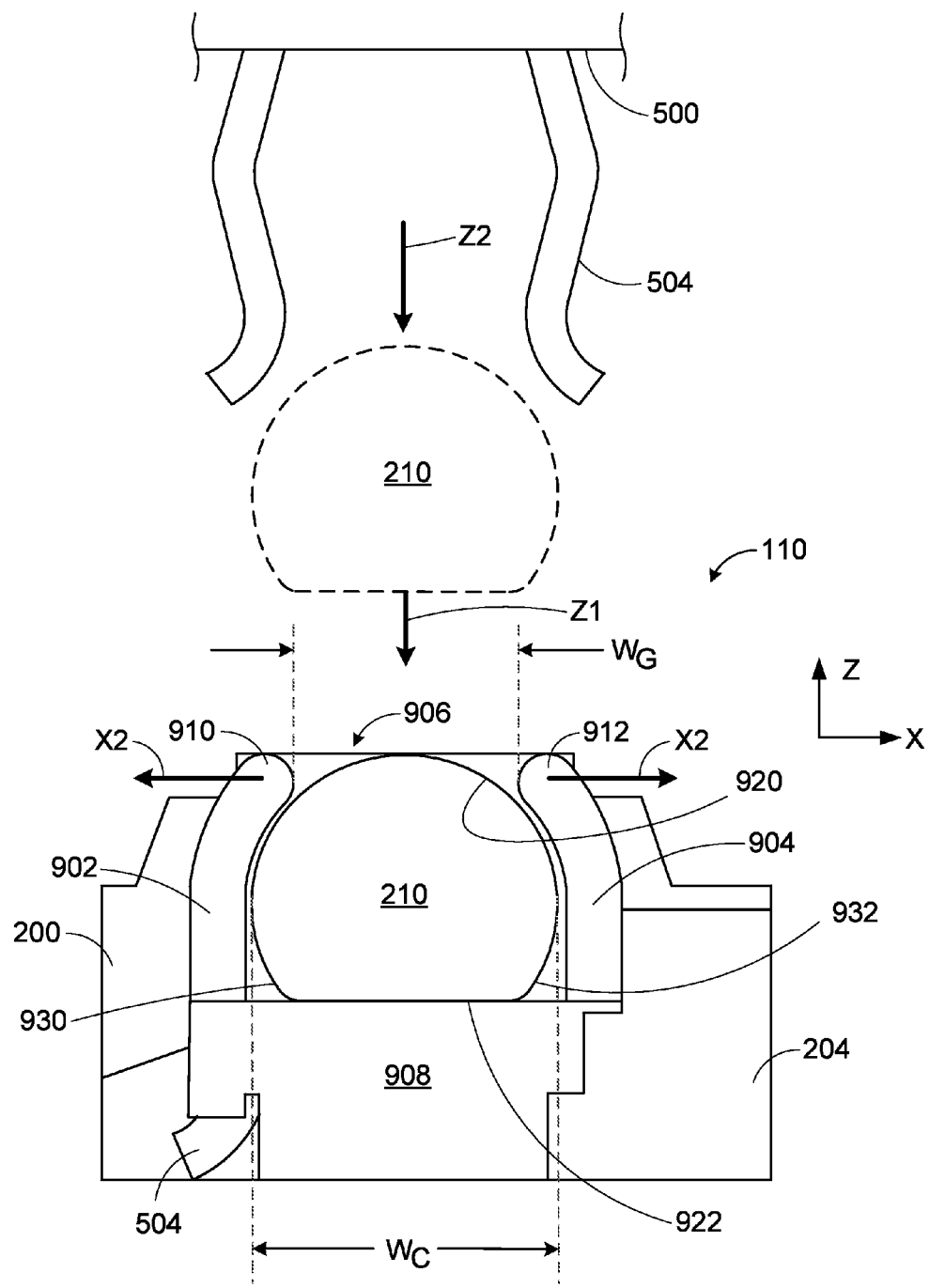
FIG. 7 is a cross-sectional view of a neutral rail snapped in a direction along the z-axis into a shield member by retaining fingers according to an aspect of the present disclosure.
Figure 8:
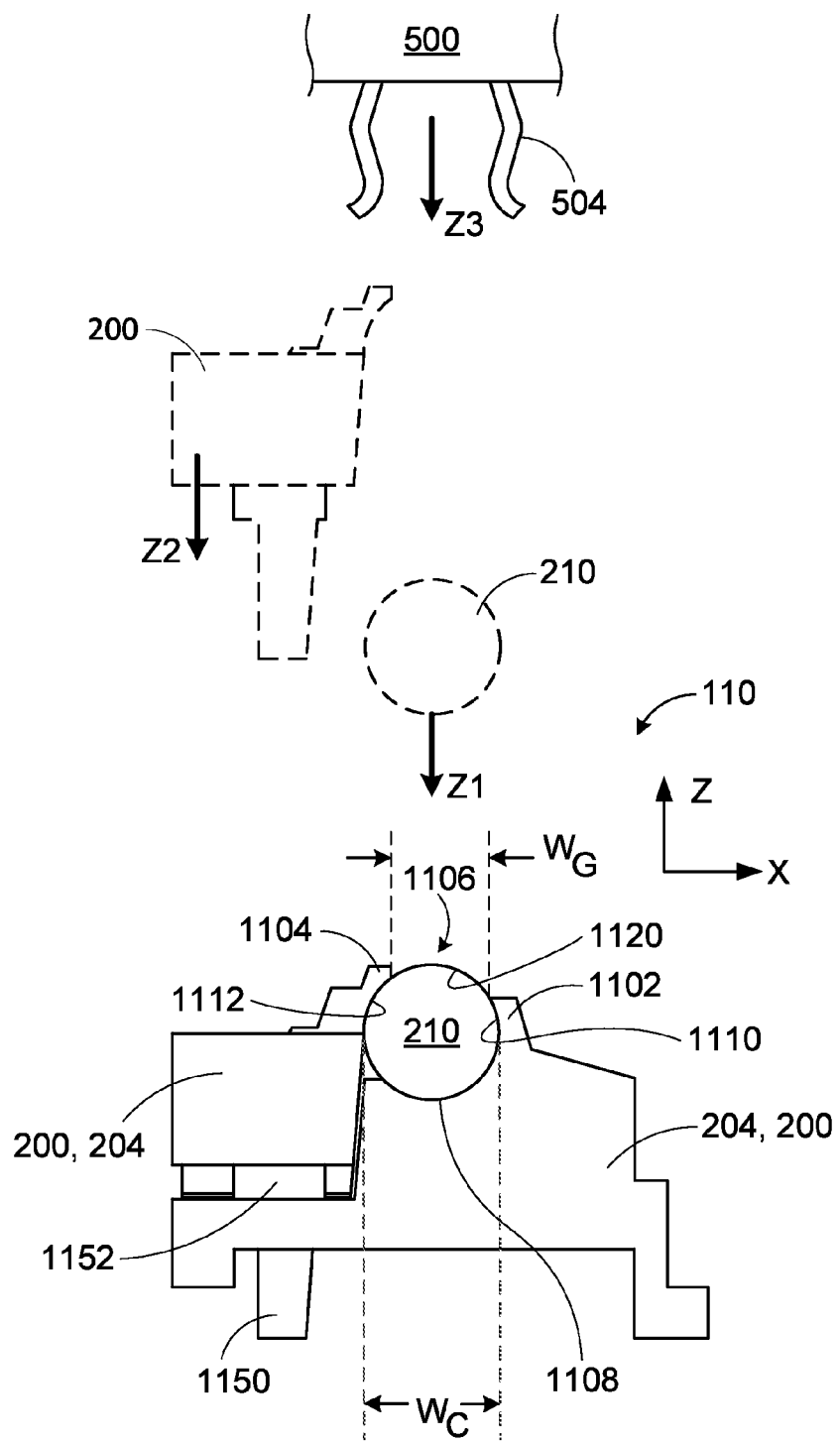
FIG. 8 is a cross-sectional view of a snap-in configuration of a plug-on section of a load center in which the neutral rail is securely retained between corresponding retention features of a base and a shield member in which the base, shield member, and neutral rail are installed along the same z-axis direction.

FIGS. 2B, 7, and 8 also feature different variations of a "snap-in" or plug-on neutral rail 210 that is installed in the Z-axis direction. By "snap-in," it is meant that the neutral rail 210 snaps into one or more retaining features to secure the neutral rail 210 into the load center 106, preferably without any fasteners, though the use of fasteners is not precluded.

Turning to FIG. 7, the plug-on section 110 includes a dielectric shield member 204 and a first retention feature 902 and a second retention feature 904 that extends away from the X-Y plane along the Z-axis. An air gap 906 is defined by the first and second retention features 902, 904. A support member 908 sits below (along the Z-axis) the gap 906. The neutral rail 210 has an overall width dimension $W_C$ that is larger than a width $W_G$ of the gap 906 such that $W_C > W_G$. The "fattest" part of the neutral rail 210 is received through the gap 906 in a direction along the Z-axis and is retained by the retention features 902, 904 against the support 908. Each of the retention features 902, 904 includes curved upper portions 910, 912 that are bent toward one another to create the gap 906 that spans the width $W_G$.

The neutral rail 210 shown in FIG. 7 has a cross section that has a generally round portion 920 along a length (Y-axis) of the neutral rail 210 and a flattened bottom portion 922 that abuts against the support member 908 when the neutral rail 210 is retained in the load center 106 by the retention features 902, 904. The cross section of the neutral rail 210 includes rounded bottom edges 930, 932 on either side of the flattened bottom portion 922 such that the rounded bottom edges 930, 932 engage the retention features 902, 904 as the neutral rail 210 is inserted in a direction along the Z-axis through the gap 906 (as indicate by the arrow Z1). In the example illustrated in FIG. 7, the retention features 902, 904 are integrally formed with the dielectric shield member 204, though the retention features 902, 904 in other aspects are not integrally formed with the dielectric shield member 204.

Each of the retention features 902, 904 has a sufficient flexibility and stiffness to allow the retention features 902, 904 to flex from an unstressed position (shown in FIG. 7) and thereby widen the gap 906 enough (see arrows X1 and X2 in FIG. 7) to allow the neutral rail 210 to be inserted through the gap 906 (see arrow Z1) and to return to the unstressed position after the neutral rail 210 has cleared the gap 906 and is installed on the flat upper surface of the support member 908. Those of skill in the art familiar with snap fit engagements will appreciate that the terms "sufficient flexibility and stiffness" depend on the relative dimensions of the width $W_G$ of the gap 906 and the width $W_C$ of the neutral rail 210, to cause the retention features 902, 904 to have enough flexibility to separate as the bottom rounded edges 930, 932 of the neutral rail 210 are forced downward along the Z-axis through the retention features 902, 904, and also enough stiffness to return to their original unstressed position before they were separated. Finally, the neutral connector 504 of a circuit breaker 500 can be plugged onto an exposed section of the neutral rail 210 by urging the circuit breaker 500 along the Z-axis direction as indicated by the arrow Z2 until the neutral connector 504 plugs onto the neutral rail 210.

FIG. 8 illustrates a neutral rail 210 being retained within the plug-on section 110 of the load center 106 through cooperating surfaces of the base 200 and the dielectric shield 204. The base 200 shown in FIG. 8 includes a first retention feature 1102 that extends away from the X-Y plane along the Z-axis. The shield member 204 includes a second retention feature 1104 that also extends away from the X-Y plane along the Z-axis. An air gap 1106 is defined by and extends between the first and second retention features 1102, 1104. A support 1108 sits below (along the Z-axis) the gap 1106 and is part of the shield member 204. The neutral rail 210 has an overall width dimension $W_C$ that is larger than a width $W_G$ of the gap 1106 such that $W_C > W_G$. The "fattest" part of the neutral rail 210 is received through the gap 1106 in a direction along the Z-axis and is first retained by the retention feature 1102 of the base 200 and the support 1108 of the shield member 204, and is then retained by the second retention feature 1104 of the shield member 204. Each of the retention features 1102, 1104 includes curved surfaces 1110, 1112 that are bent toward one another to create the gap 1106 that spans the width $W_G$. These surfaces 1110, 1112 mate with corresponding the curved surface 1120 of the neutral rail 210. In the illustrated example shown in FIG. 8, the neutral rail 210 is a round bar with a round cross section along the entire length (along the Y-axis) of the neutral rail 210. The neutral rail 210 has an exposed surface portion 1120 that is configured to receive thereon a plug-on neutral connector 504 of a circuit breaker 500 (shown in FIG. 8). The base 200 and the shield member 204 can be snap fit together by respective snap fit features 1150, 1152.

To assemble the plug-on section 110 shown in FIG. 8, the dielectric shield 204 can be placed down first (note that the dielectric shield 204 and the base 200 are interchangeable), and then the neutral rail 210 can be installed in the Z-axis direction indicated by the arrow Z1 into the support 1108, and then the base 200 (which is interchangeable with the dielectric shield) in installed in the Z-axis direction indicated by the arrow Z2 over the dielectric shield 204 and snap-fit thereto by the cooperation of snap fit features 1150, 1152. Finally, a neutral connector 504 of a circuit breaker 500 is plugged onto an exposed section of the neutral rail 210 in the Z-axis direction as indicated by the arrow Z3.

Figure 9:
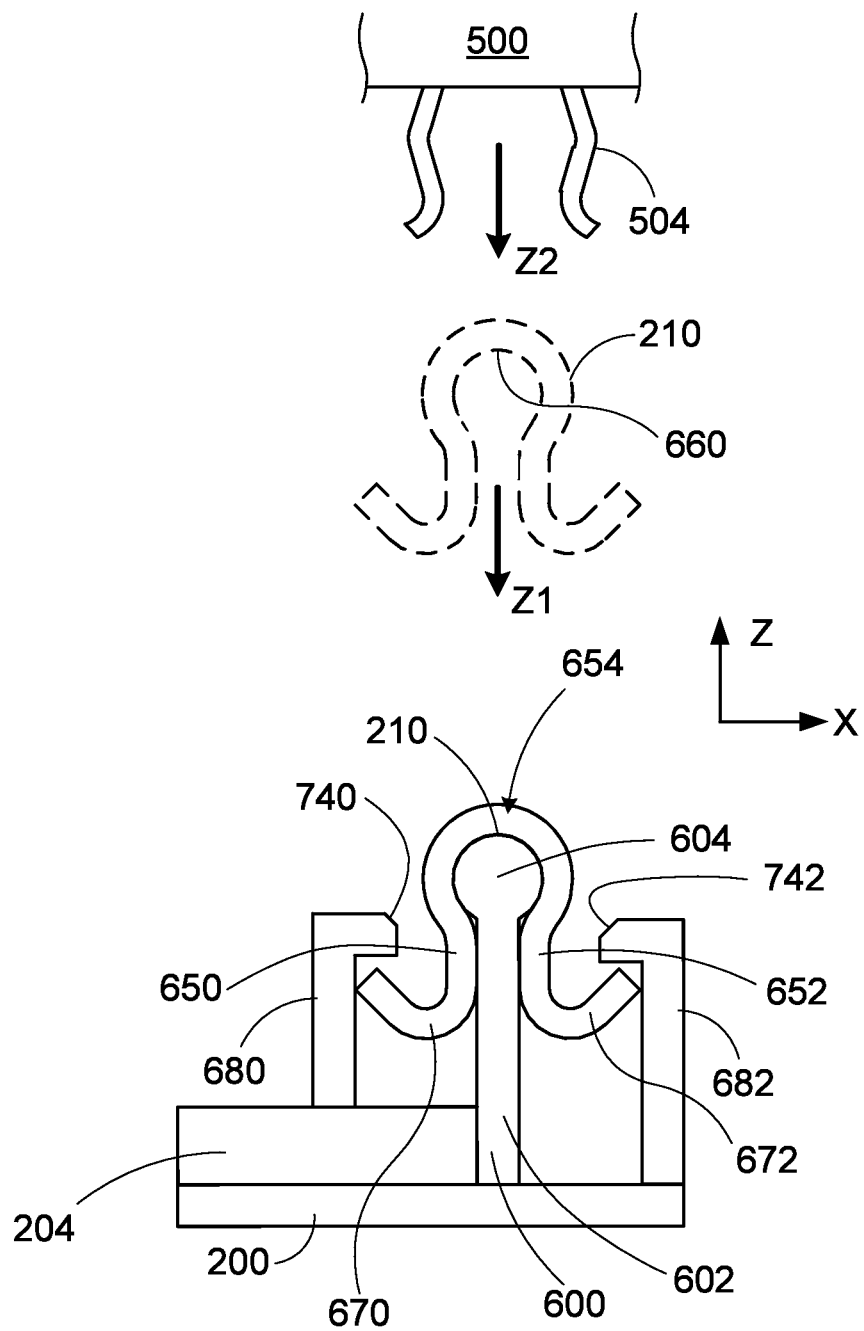
FIG. 9 is a cross-sectional view of a snap-on neutral rail that features a pair of legs with flared out ends that snap fit under retention hooks of the base where the neutral rail is installed onto a support member of the base in a direction along the z-axis.

FIG. 9 is a perspective illustration of part of a plug-on section 110 like the one shown in FIG. 1, which includes a support 600 that extends away from the X-Y plane along the Z-axis. The support 600 includes a lower portion 602 and an upper portion 604 that is wider than the lower portion 602. In the illustration shown in FIG. 9, the neutral rail 210 and the support 600 approximate a keyhole form factor or cross-section, in which the upper portion 604 has a cylindrical section that transitions to the rectangular lower portion 602. The neutral rail 210 has two legs 650, 652 that extend along the lower portion 602 of the support 600 and a plug-on portion 654 that extends around the upper portion 604 of the support 600. In this example, the support 600 is integral with the shield member 204, though in other aspects, the support 600 can be part of the base 200 or a separate piece from both the base 200 and the shield member 204.

The neutral rail 210 is snap-fit over the cylindrical upper portion 604 of the support 600 in a direction along the Z-axis (see arrow Z1) such that the two legs 650, 652 straddle the lower portion 602 of the support 600, and such that the plug-on portion 654 of the neutral rail 210 engages the upper portion 604. The neutral rail 210 includes an angled feature 670, 672 (see FIG. 9) that is angled away (flared out) from one of the two legs 650, 652 and away from the lower portion 602 of the support 600 toward (on the Z-axis) the upper portion 604. A first snap fit hook 680 in the example shown is part of the base 200, and the first lanced out feature 670 is snap fit to the first snap fit hook 680 when the neutral rail 210 is installed onto the upper portion 604 in the direction along the Z-axis. As described above, the upper portion 604 of the support 600 can have a cylindrical feature extending along a length (Y-axis) of the support 600 such that the support 600 resembles an approximate keyhole shape. The plug-on portion 654 of the neutral rail 210 has a rounded inner surface 660 (FIG. 9) to engage the cylindrical feature or upper portion 604 of the support 600 in response to the neutral rail 210 being installed on the upper portion 604. The plug-on section 110 also includes a second snap fit hook 682 opposing the snap fit hook 680 such that the angled features 670, 672 of the legs 650, 652 of the neutral rail 210 become trapped under the first and second snap fit hooks 680, 682, respectively, in response to the rounded top portion 654 being snap fit onto the cylindrical feature or upper portion 604 of the support 600. A neutral connector 504 of a circuit breaker 500 can be plugged onto an exposed section of the neutral rail 210 in the Z-axis direction as indicate by the arrow Z2.

Figure 10:
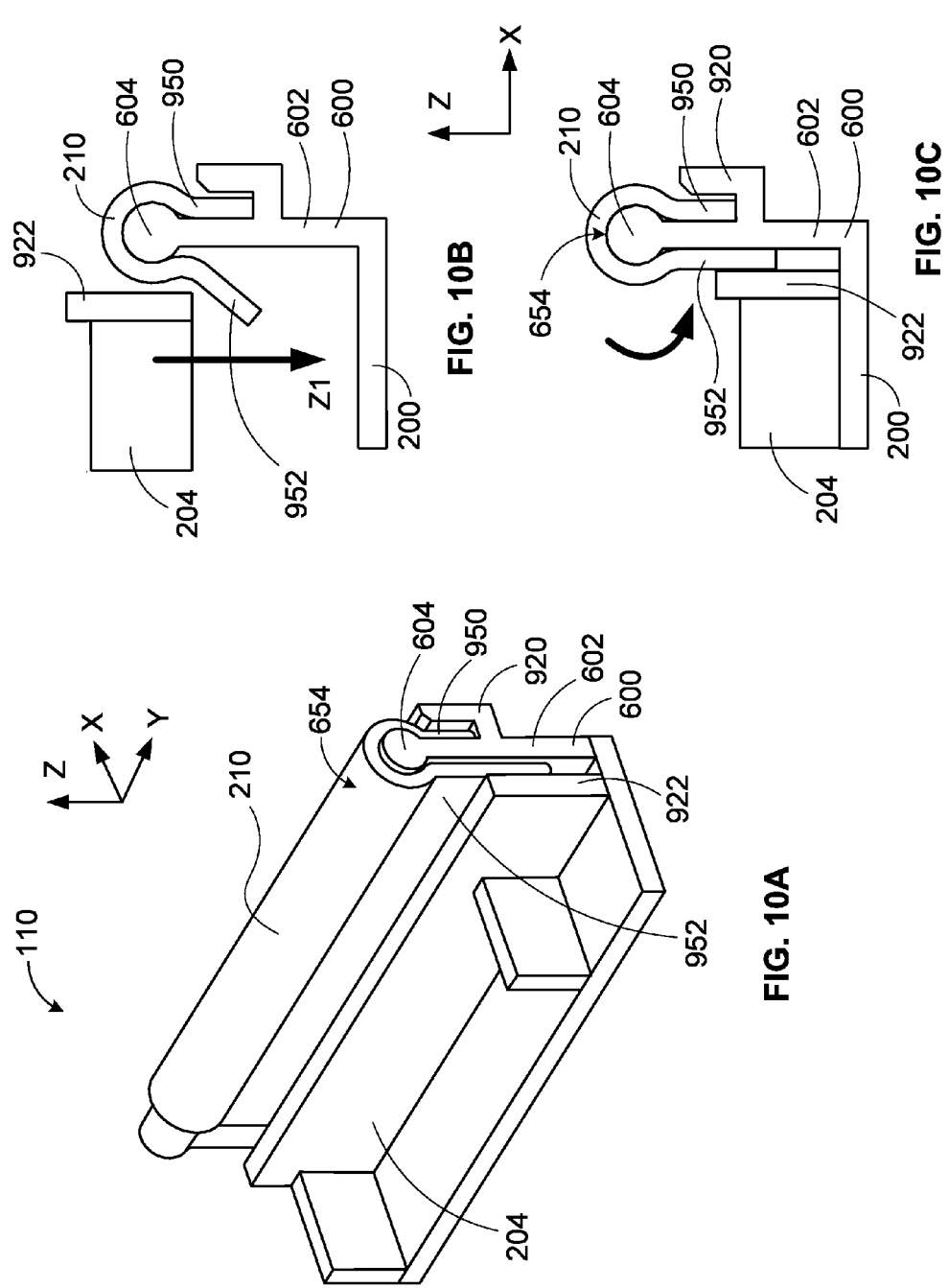
FIGS. 10A-10C illustrate perspective and cross-sectional views of a snap-on neutral rail having a pair of legs, one shorter than the other and initially bent away from one another, in which the longer leg is bent into parallel arrangement with the shorter leg by the installation along the z-axis of a shield member onto the base according to yet a further aspect of the present disclosure.
Figure 11:
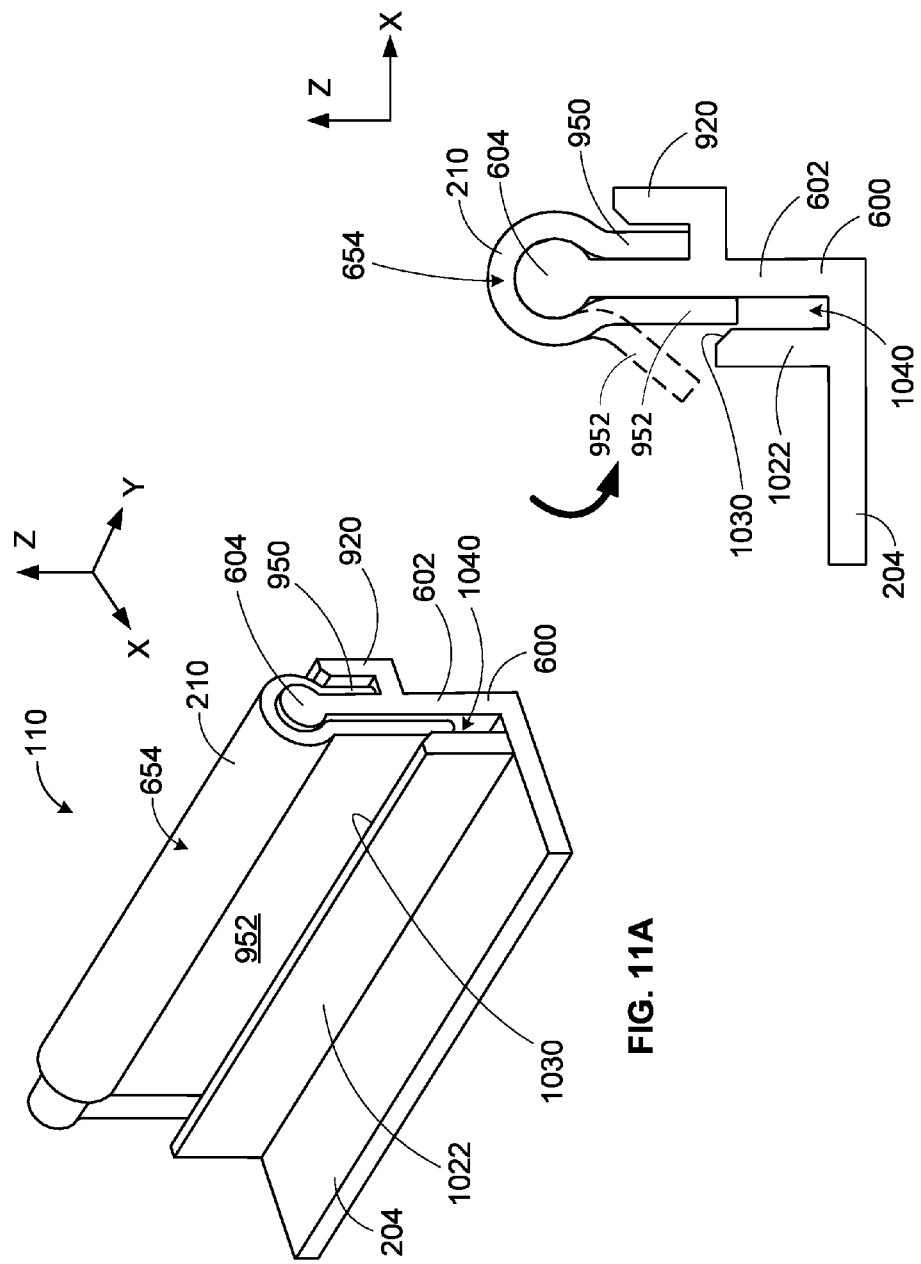
FIGS. 11A and 11B illustrate perspective and cross-sectional views of a snap-on neutral rail like the one shown in FIGS. 10A-10C except that the legs are retained by leg retention features formed in the dielectric barrier according to a further aspect of the present disclosure.

The next two configurations shown in FIGS. 10A-11B show a neutral rail 210 having two legs 950, 952 in which one of the legs is shorter than the other. The first leg 950 of the neutral rail 210 is shorter than the second leg 952. The support 600 including a first leg retention feature 920 into which the first leg 950 is received. A second leg retention feature 922, which can be part of the shield member 204 as shown in FIG. 10A or part of the base as shown in FIG. 11A, is configured to hold the second leg 952 against the lower portion 602 of the support 600 after the neutral rail 210 is snap fit onto the upper portion 604 of the support 600. The upper portion 604 is cylindrically shaped like the arrangement shown in FIG. 9. As shown in FIG. 10B, the second leg 952 of the neutral rail 210 is originally bent away (X-axis) from the first leg 950 in a non-parallel manner, and the neutral rail 210 is snap-fit installed in the Z-axis direction onto the top portion 604. As indicated by the arrow Z1, the shield member 204 is then installed in a downward direction along the Z-axis, and as the shield member 204 is installed onto the base 200, the second leg retention feature 922 rotates the bent second leg 952 (as shown by the anticlockwise arrow in FIG. 10C) into a parallel position relative to the first leg 950 until the second leg 952 abuts the lower portion 602 of the support 600.

In FIGS. 11A-11B, a second leg retention feature 1022 is part of the shield member 204 (or the base 200). The second leg retention feature 1022 is spaced apart from the lower portion 602 of the support 600 and parallel to the support 600. The second leg retention feature 1022 includes an angled surface 1030 at a leg-engaging end (where the lead line for reference number 1030 ends). The angled surface 1030 is angled toward (X-axis) the lower portion 602 to permit the second leg 952 of the neutral rail 210 to be bent (or rotated) into snap fit engagement past the angled surface 1030 and into a space 1040 between the second leg retention feature 1022 and the lower portion 602 of the support 600. To assemble this plug-on section 110 of FIGS. 11A-11B, the base 200 or the shield 204, which includes the second leg retention feature 1022, is installed onto the rear wall 104 along a Z-axis direction. The neutral rail 210 with an outwardly bent second leg 952 is installed onto the support 600 also in the same Z-axis direction. Finally, the outwardly bent second leg 952 of the neutral rail 210 is rotated toward the support 210 past the angled surface 1030 into snap fit engagement with the second leg retention feature 1022.

Figure 12:
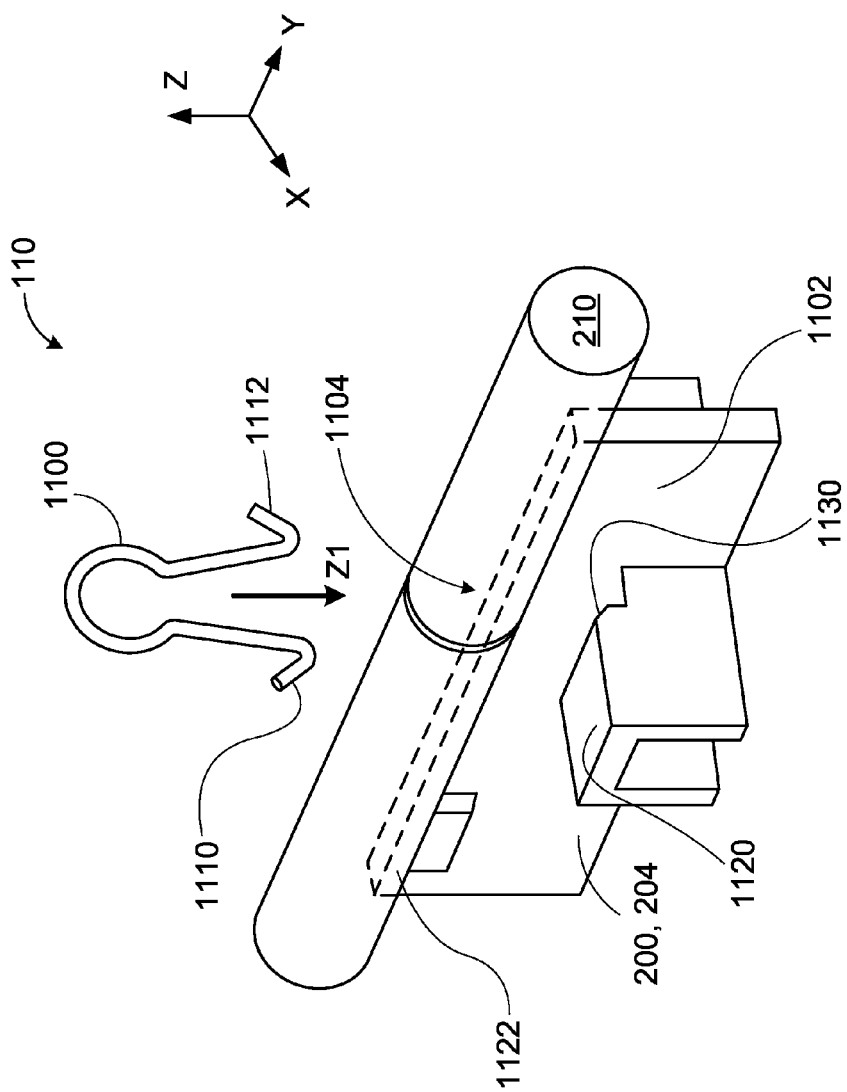
FIG. 12 is a perspective view of a neutral rail that is held onto a support of a dielectric barrier by spring clips, which are themselves snap fit under hook retaining features of the dielectric barrier, where both the spring clips and the neutral rail are installed onto the support along the z-axis direction.

FIG. 12 illustrates part of a different embodiment of a plug-on section 110 shown in FIG. 1 and uses a spring clip 1100 to secure the neutral rail 210 onto a support 1102, which can be part of the base 200 or the shield member 204. The support 1102 can feature a flange 1122 that slides into a corresponding notch formed on the bottom of the neutral rail 210. The neutral rail 210 has a notch 1104 formed along its surface (parallel to a cross section of the neutral rail 210) to receive the spring clip 1100, which is installed along the Z-axis direction (see arrow Z1) and snap-fitted or clipped into the notch 1104. The spring clip 1100 includes a pair of opposing hook ends 1110, 1112 that are bent upwards (Z-axis) away from the support 1102 and away from each other as shown in FIG. 12. As the spring clip 1100 is moved along the Z-axis direction toward the support 1102, the hook end 1110 is received under a hook retaining feature 1120, which includes an angled surface 1130 that is angled toward the support 1102 and away from the neutral rail 210 to facilitate the receipt of the hook end 1110 under the hook retaining feature 1120. The other hook end 1112 is also received under a corresponding hook retaining feature (hidden from the perspective angle shown in FIG. 12) that is like the hook retaining feature 1120 that is visible in FIG. 11. Multiple spring clips 1100, notches 1104, and sets of hook retaining features 1120 can be spaced along the length (Z-axis) of the neutral rail 210 to secure the neutral rail 210 by snap fit connection to the support 1102 without the need for any fasteners.

Figure 13:
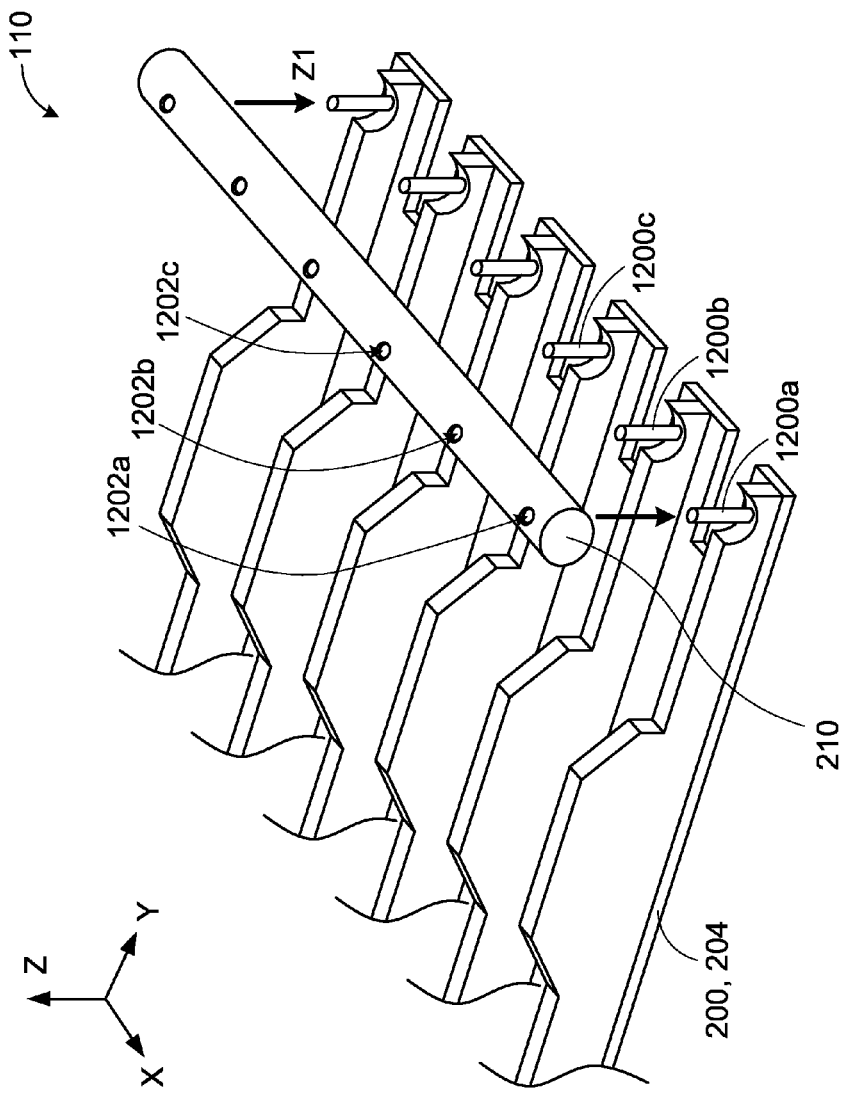
FIG. 13 is a perspective view of a dielectric barrier featuring posts onto which a neutral rail featuring through-holes is installed along the z-axis direction, and the protruding ends of the posts are heat-staked to secure the neutral rail to the dielectric barrier.

FIG. 13 illustrates another fastener-less way of securing a neutral rail 210 to a dielectric substrate, such as the base 200 or the shield member 204 shown in FIG. 1, along a Z-axis direction. The dielectric substrate 200, 204 includes posts 1200a, 1200b, 1200c (only three are labeled, but the substrate 200, 204 includes many of such posts), generally designated as 1200, that protrude away from the substrate 200, 204 along the Z-axis indicated by the arrow Z1. The neutral rail 210 includes through-holes 1202a, 1202b, 1202c (again, only three are labeled for ease of illustration) formed by a countersink drill such that the holes are conical shaped as shown in FIG. 13. The holes, generally designated as 1202, pass through the diameter of the neutral rail 210. The neutral rail 210 is installed onto the substrate 200, 204 by aligning the through-holes 1202 with their corresponding posts 1200, and then the neutral rail is dropped downwards (along the Z-axis) onto the substrate 200, 204, until the tips of the posts 1200 protrude through the tops of the through-holes 1202. These exposed tips are then heat-staked to secure the neutral rail 210 to the substrate 200, 204.

A method of constructing a load center in a panel whose depth lies in the Z axis is provided. A dielectric base or bottom substrate (such as the base 200 or the shield member 204 or both) is provided with a rail-holding portion that at least partially holds or retains a plug-on neutral rail to the base. The dielectric base or substrate provides a dielectric separation and air-gap spacing between energized conductors (e.g., phase and neutral) and grounded structures (e.g., the metal panel enclosure). The dielectric base or substrate can be provided with a machinery movement in the Z-axis, such as by a robotic arm. The rail-holding portion can be, in different implementations, a protrusion, a retention or retaining member, a conformal nest or bowl that conforms to the form factor of an engaging surface of the neutral rail. A plug-on neutral rail, such as the rail 210, is inserted with a machinery movement in the Z-axis onto the rail-holding portion of the base or substrate. During the Z-axis placement of the neutral rail onto the rail-holding portion, the machinery movement causes the plug-on neutral rail to engage the rail-holding portion. Optionally, such as described above in connection with FIG. 12 or 13, the neutral rail is secured against the rail-holding portion with a machinery movement in the Z-axis, such as by heat-staking exposed plastic rods from FIG. 13, clipping a spring clip over the neutral rail from FIG. 12, or engaging the base 200 with the shield member 204 to retain the neutral rail such as shown in FIG. 8. In an implementation such as shown in FIG. 8, a shield member 204 (or the base 200), is engaged with a machinery movement in the Z-axis over the provided base 200 (or shield member 204—as noted above, these parts are interchangeable), and a retention member, such as the retention feature 1104 shown in FIG. 8, is placed adjacent to the neutral rail 210 in juxtaposition with the rail-holding portion (e.g., the retention feature 1102).

According to any of the examples disclosed herein, once the load center 106 is assembled, the assembled load center 106 can be installed with a machinery movement in the Z-axis into the metal enclosure 102. Alternately, the load center 106 can be assembled within the enclosure 102. For example, the dielectric base can be first inserted and secured into the rear wall 104 of the enclosure 102 with a machinery movement in the Z-axis, and then the neutral rail 210 can be installed into or onto the installed base after the base is installed into the enclosure 102.

Words of degree, such as "about," "substantially," and the like are used herein in the sense of "at, or nearly at, when given the manufacturing, design, and material tolerances inherent in the stated circumstances" and are used to prevent the unscrupulous infringer from unfairly taking advantage of the invention disclosure where exact or absolute figures and operational or structural relationships are stated as an aid to understanding the inventive aspects disclosed herein.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of assembling a plug-on neutral rail into a panel of an electrical distribution apparatus, comprising the steps of:
   providing a fixed dielectric base having a major surface lying along a plane;
   placing over the base a dielectric shield member such that a bottom surface of the shield member rests a distance above a top surface of the base, the shield member having a plurality of retention feature pairs, each of the retention feature pairs forming a gap therebetween;
   inserting lengthwise through the gap an elongate plug-on neutral rail having an oblong cross-section along a narrow dimension of the cross-section; and
   responsive to a rotation of the neutral rail by at least 90 degrees, applying a force to decrease the distance between the bottom surface of the shield member and the top surface of the base.

2. The method of claim 1, wherein the applying the force causes the neutral rail to be held between a protrusion extending away from the plane along a z-axis orthogonal to the plane and corresponding bottom surfaces of the retention feature pairs.

3. The method of claim 1, wherein the placing is carried out in a direction along a z-axis orthogonal to the plane followed by the inserting, wherein the inserting is carried out in the same direction along the z-axis.

4. The method of claim 3, wherein the applying the force is carried out in the same direction along the z-axis.

5. The method of claim 1, wherein the applying the force causes the shield member to be snap-fit to the base.

6. The method of claim 1, wherein inserting the neutral rail through the gap causes the neutral rail to automatically rotate by the at least 90 degrees, and wherein the neutral rail following the applying the force is retained securely between the shield member and the base without any fasteners to secure the neutral rail to the shield member or to the base.

7. The method of claim 1, further comprising the step of, following the applying the force, securing the major surface of the base to a rear wall of the panel such that the major surface abuts against the rear wall.

8. A method of assembling a plug-on neutral rail into a panel of an electrical distribution apparatus, comprising the steps of:
providing a dielectric shield member and a dielectric base, at least one of said shield member and said base having a major surface lying along a plane that is coincident with a rear wall of the panel;
providing a first retention feature and a second retention feature separated from the first retention feature by a gap;
inserting through the gap an elongate plug-on neutral rail in a direction along a z-axis that is orthogonal to the plane, wherein a width of the gap is smaller than an overall width of the neutral rail; and
after the neutral rail has been inserted through the gap, urging the shield member and the base toward one another to securely retain the neutral rail between the first and second retention features and the base.

9. The method of claim 8, wherein both the dielectric shield member and the dielectric base are provided, the method further comprising the step of installing the shield member in the direction along the z-axis over the dielectric base having a major surface parallel to the plane.

10. The method of claim 9, wherein the shield member and the base cooperate to securely retain the neutral rail between the first and second retention features without fasteners to secure the neutral rail to the shield member or to the base such that the neutral rail remains between the gap and the base when a neutral connector of a circuit breaker plugged onto the rail is unplugged from the neutral rail.

11. The method of claim 8, wherein the inserting includes spreading apart the first and second retention features as the neutral rail is inserted through the gap until the neutral rail clears the gap and the first and second retention features return to their unstressed position to create a snap fit connection between the neutral rail and the shield member.

12. A method of assembling a plug-on neutral rail, which is connectable to a neutral busbar, into a panel of an electrical distribution apparatus, comprising the steps of:
providing a dielectric shield member and a dielectric base, at least one of said shield member and said base having a major surface lying along a plane that is coincident with a rear wall of the panel;
providing a first retention feature and a second retention feature separated from the first retention feature by a gap,
wherein the first retention feature is integral with the shield member and the second retention feature is integral with the base;
following the providing the shield member, then installing an elongate plug on neutral rail against the first retention feature of the shield member; and
after installing the neutral rail against the first retention feature, then installing the base such that the second retention feature of the base forms the gap, wherein a width of the gap is smaller than an overall width of the neutral rail, and the neutral rail is secured between the first and second retention features and the base and the shield member without any fasteners to secure the neutral rail to the base or to the shield member.

13. A method of assembling a plug-on neutral rail into a panel of an electrical distribution apparatus, comprising the steps of:
providing a dielectric substrate having a major surface lying along a plane that is coincident with a rear wall of the panel, the substrate further having a dielectric support that extends from the substrate along a z-axis that is orthogonal to the plane, the support having an exposed upper portion that originates from a centerline of the support that is parallel to the z-axis and that extends outward therefrom and is wider than a lower portion of the support that also originates from the centerline of the support and extends outward therefrom; and
snap-fitting onto the upper portion of the support an elongate plug-on neutral rail in a direction along the z-axis; and
wherein the substrate includes a first retention feature and a second retention feature on opposite sides of the neutral rail when installed onto the upper portion, the method further comprising snap-fitting exposed angled features of the neutral rail to the first and second retention features by urging the neutral rail along the z-axis direction onto the upper portion, without using any fasteners to secure the neutral rail to the dielectric substrate.

14. The method of claim 13, further comprising:
after the snap-fitting, installing a second dielectric member over the dielectric substrate such that an outwardly bent leg of the neutral rail is rotated toward the support as the second dielectric member is moved in a direction along the z-axis onto the dielectric substrate.

15. The method of claim 13, wherein the neutral rail includes a first leg and a second leg that both straddle the support when the neutral rail is installed onto the support, wherein the second leg is initially bent outwardly away from the first leg when the neutral rail is installed onto the support, and wherein the dielectric substrate includes a leg retention feature, the method further comprising:
after the snap-fitting, rotating the second leg toward the first leg until the second leg is securely retained by the leg retention feature of the dielectric substrate against the support.

16. The method of claim 13, wherein the upper portion of the support is cylindrical and the lower portion of the support is rectangular.

* * * * *